Oct. 18, 1932.  E. A. ROCKWELL ET AL  1,882,929
BRAKE LINKAGE
Filed May 29, 1929   2 Sheets-Sheet 2
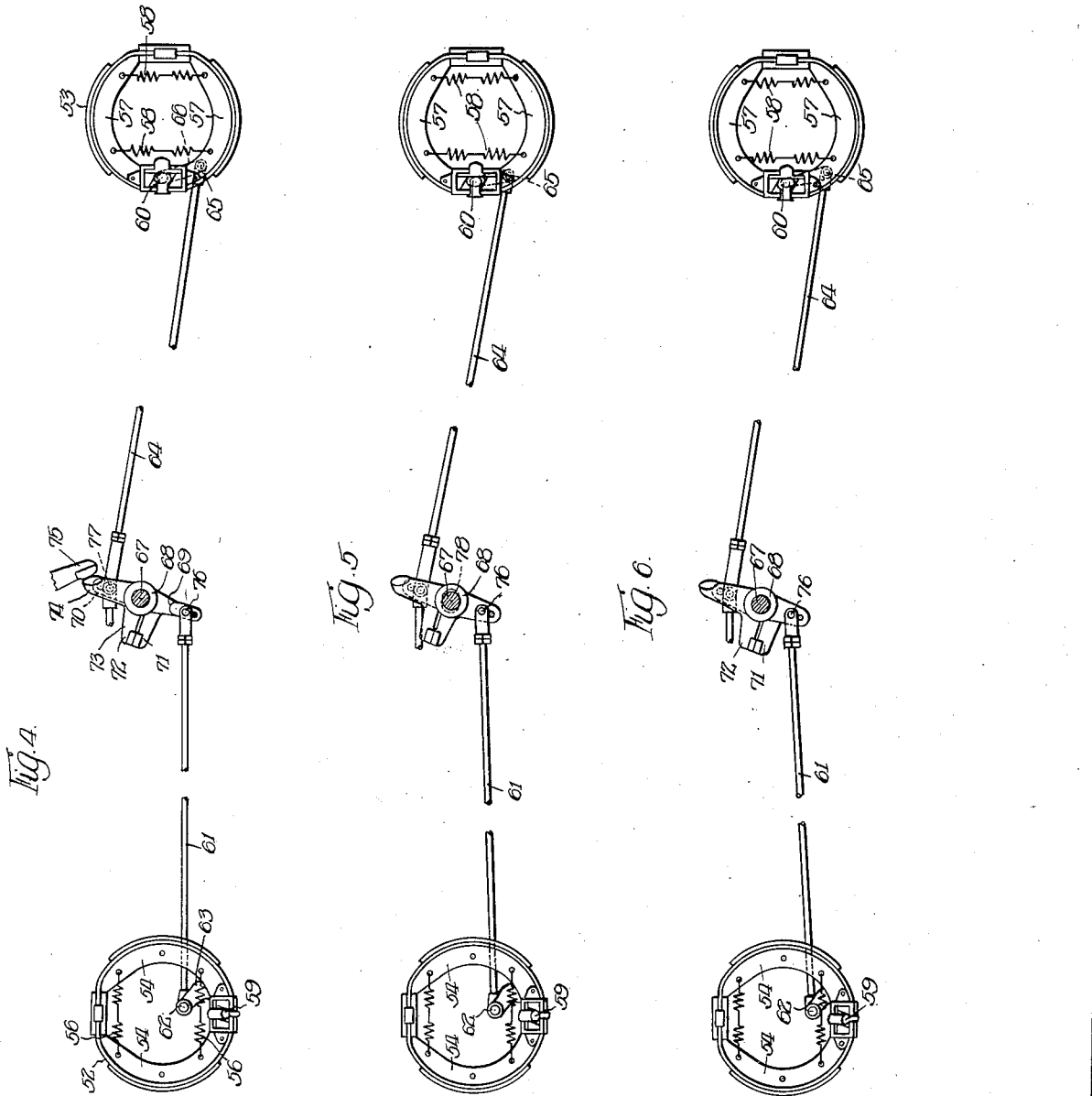
Inventors
Edward A. Rockwell,
Edwin R. Evans, Patented Oct. 18, 1932

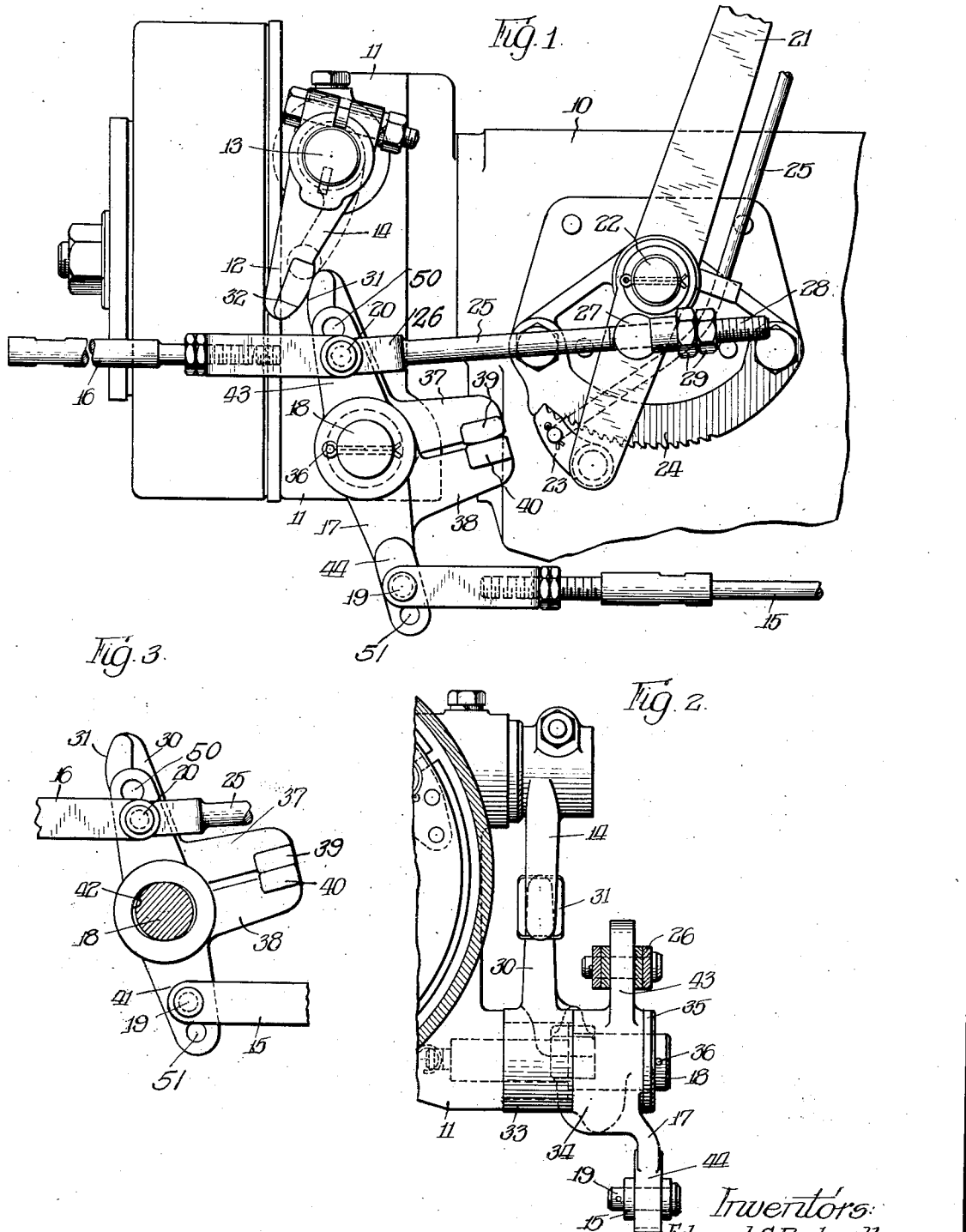

1,882,929

UNITED STATES PATENT OFFICE

EDWARD A. ROCKWELL AND EDWIN R. EVANS, OF CHICAGO, ILLINOIS

BRAKE LINKAGE

Application filed May 29, 1929. Serial No. 366,844.

This invention relates to new and improved brake operating mechanism and more particularly to such mechanism which is associated with power operated means for developing the brake applying force under the selective control of the operator.

Brake mechanisms have been developed whereby the operator by relatively slight pressure may selectively control the operation of a power device which may, in some instances, derive its energy from the rotation of the power shaft of the vehicle and develop sufficient braking force to apply the brakes to the wheel drums and stop the vehicle. Such mechanism proves highly efficient in connection with present four-wheel brake construction and provides maximum safety. Usually an independent emergency or parking control is provided since various State regulations require that in case of a single break anywhere in the brake mechanism, independent means must be provided whereby the operator may set at least two of the brakes.

Brake mechanisms have been used in which a greater amount of braking force is applied to the front brakes than to the rear brakes. This is especially desirable when a power unit is used since a portion of the braking is directly applied to the power shaft of the vehicle and is, therefore, transmitted through the rear wheels, but other considerations make the front brakes more effective than the rear brakes. Such mechanism as have been developed, however, generally require frequent adjustment to compensate for the greater wear occasioned at the front end.

It is, therefore, a purpose of the present invention to provide improved brake linkage whereby a greater amount of braking can be done at the front wheel brakes and to so construct the brake linkage that the increased front braking will be obtained in spite of uneven wear of the linings as between the front and rear brakes.

Another purpose of the present invention is to provide a neutralized or balanced center for the lever to which the thrust of the power arm is transmitted whereby vibration and chattering of the linkage is eliminated.

Another purpose of this invention is to provide improved brake linkage which will be operated by a power device to set the front and rear brakes and also to provide independent means under the control of the operator whereby the brakes may be set without causing actuation of the power device.

It is further an object of the present invention to provide brake linkage which is operated by the power device and which is so designed that equalization of the braking effort to the front and rear brakes may be had in spite of a variation in adjustment between the front and rear brakes.

A particular feature of the present improvements is the combination of a power arm to actuate an intermediate pivoted lever and a brake lever connected to the brake rods which is actuated by the movement of the intermediate lever and to connect the emergency control to the brake lever whereby, in spite of the breakage of the intermediate lever, thereby disabling the actuation of the brakes by the power device, the operator may still set the brakes by the emergency control.

Another feature of the present invention is the provision of a bearing opening in the brake lever which is slightly enlarged with respect to a supporting shaft in such a manner that lateral movement of the braking lever is permitted in order to equalize the braking force on the front and rear brakes.

Further objects and advantages of the present improvements will be more readily apparent as the description proceeds in connection with the attached drawings in which—

Figure 1 is a side elevation of the assembled mechanism.

Figure 2 is a partial end elevation taken from the left hand end of Figure 1, while Figure 3 is a sectional view through the supporting shaft for the brake lever illustrating the modified mounting of the brake lever.

Figure 4 illustrates the connections of the brake rods to the front and rear brakes from a power unit construction such as illustrated in Figure 1.

Figure 5 illustrates the connections of the brake rods and a balanced center is provided as shown in Figure 3.

Figure 6 illustrates the connections of the brake rods similar to Figure 4 and in which effective lever arms of the central lever are substantially equal.

In the drawings, 10 indicates a transmission housing of a vehicle while 11 indicates a housing for a power brake device which causes the actuation of the power arm 12. The power arm 12 is secured to its pivot shaft 13 which is actuated by a yoke 14, shown in dotted lines within the housing. In the customary installation of a power brake device on a vehicle, the operator may control the power device by the operation of a brake pedal or by other suitable means. Thus there is usually provided an arm extending into the power device which requires very slight pressure to effect its movement and the power device of itself will develop sufficient energy to move the power arm 12 in a counter-clockwise direction, as shown in Figure 1, and transmit its force to the brake linkage to set the brakes.

In the present construction there is shown a brake rod 15 extending to the front brakes and a brake rod 16 extending to the rear brakes, since the mechanism is especially designed to operate the brakes on vehicles of the present four-wheel brake design but it will be obvious that, if so desired, only rear brakes may be utilized. The brake rods are connected to a pivoted brake lever 17 freely mounted on the stub shaft 18. Thus a pivotal connection 19 is provided on the downwardly extending arm of the lever 17 for the forward brake rod and a pivotal connection 20 is provided on the upwardly extending arm for the rear brake rods 16. Additional openings may be provided in the arms of the lever 17 for varying the leverage to the brake rods. Thus an opening 50 is shown above the pivot 20 and an opening 51 is shown below the pivot 19. In some instances it may be desirable to use equal lever arms to front and rear as will later more clearly appear. Thus movement of the brake lever 17 in a clockwise direction will transmit a pull to both the forward and rear brake rods in order to set the brakes. An emergency lever 21 is shown mounted on the stub shaft 22 extending from a mounting on the transmission housing 10. Pivoted to the lower end of the emergency lever 21 is the customary ratchet 23 adapted to engage a stationary rack sector 24 and connected to the ratchet 23 is a spring rod 25 whereby operative movement of the emergency lever 21 will automatically cause latching engagement between the ratchet 23 and the rack sector 24. The emergency lever 21 is designed to impart its movement to a connecting rod 25 which includes a clevis 26 pivotally connected to the upwardly extending arm of the brake lever 17 at the pivot 20. The connecting rod is freely movable in one direction through a swivel pin 27 mounted in the lower extension of the emergency lever 21 beneath the pivot 22. The connecting rod is formed with a threaded end 28 and adjusting nuts 29 are provided to limit the movement of the connecting rod through the swivel pin 27. Movement of the brake lever 17 in a clockwise direction to set the brakes when actuated by the power device may, therefore, take place without disturbing the emergency lever 21 since the connecting rod 25 will freely slide through the swivel pin 27, but it is apparent that the operator may selectively control the operation of the brakes independently of the actuation of the power device by counter-clockwise movement of the emergency lever from the position shown in Figure 1.

An intermediate lever 30 is provided pivotally mounted on the same shaft 18 which forms a mounting for the brake lever 17. The intermediate lever 30 has an upwardly extending arm and a curved contacting face 31 adapted to engage with the contacting face 32 of the power arm 12. The mounting of the brake lever 17 and the intermediate lever 30 will be apparent from Figure 2 in which the housing 11 of the power device is shown to be provided with a cylindrical bearing for the pivot shaft 18 and the hub 33 of the intermediate lever 30 is pressed against the housing 11, while the hub 34 of the brake lever 17 is pressed against the hub 33 by the washer 35 which is suitably held in place by the cotter pin 36. The stub shaft 18 may, if so desired, be held in place by a spring (not shown) in order to closely hold the levers against axial movement relative to the pivot shaft 18.

The intermediate lever 30 is designed to impart its movement to the brake lever 17 through an angularly extending arm 37 which is arranged to engage an arm 38 which extends from the brake lever 17. Thus the arm 37 has formed therewith a laterally extending lug 39 which lug, as shown in Figure 1, is in engagement with a laterally extending lug 40 from the arm 38. It will, therefore, be apparent that the brake lever 17 is substantially a T-shaped lever while the intermediate lever 30 is substantially L-shaped.

Upon operation of the power device effectuating the movement of the power arm 12 in a counter-clockwise direction, the levers 30 and 17 will move as a unit in a clockwise direction about the shaft 18 and thereby transmit a pull both to the front brake rod 15 and the rear brake rod 16. If, however, it is desired to set the brakes by the emergency control, movement of the emergency lever 21 in a counter-clockwise direction will move the brake lever 17 in a clockwise direction and the brake lever 17 will move while the intermediate lever 30 remains stationary. If breakage should occur at a single point in any of the operating members, the operator will still have control of at least two brakes, for example:—if the pivot shaft 18 should break, the brake lever 17 will still be supported by its connected brake rods and movement of the emergency lever will set the rear brakes by a direct pull transmitted to the rear brake rod 16.

It will be understood that where a power device is utilized mounted on a transmission shaft, there will be some braking force supplied at that point and, therefore, the rear brakes will not need to use as much braking power as the front brakes. Furthermore, it has been found to be highly desirable to do more of the braking at the front end since, during the retardation of the vehicle, the inertia tends to put more weight on the front wheels and the braking action is therefore more efficient. In the present construction provision is made whereby the rear brake rod is connected to a shorter lever arm and therefore has a shorter travel than the front brake rod. Thus the upper arm 43 of lever 17 is shorter than the lower arm 44.

It will also be understood that if the thrust of the power arm were imparted directly to the lever 17 at its upper end, there would be a tendency to spring the pivot shaft 18 by reason of a substantially horizontal force imparted thereto. Such a springing of the pivot pin is liable to cause a vibration and chattering of the brakes but by the use of the double system of levers shown, a force upon the supporting pin 18 becomes a substantially vertical thrust which will not cause any trouble. Thus in applying force of the power arm to the arm 30 of the intermediate lever, there is a tendency for the cooperating lugs 39 and 40 to become a fulcrum point and thereby a substantially vertical strain results on the pivot pin 18. It will be noted that the plane of contact between the lugs 39 and 40 is slightly below the pivot center of the levers which also assists in producing this effect.

As a further feature of the present improvements we may use a brake lever 41, such as shown in Figure 3, which is mounted upon the pivot shaft 18 and has its arm connected to the front brake rod 15 and the rear brake rod 16 and the emergency control connecting rod 25. In this design the bearing opening of the brake lever instead of being circular is formed with a slightly elongated slot 42. Upon movement of the brake lever 41 in a clockwise direction, should the brakes at one end of the car take hold before the brakes at the other end of the car, the brake lever will be free to slightly move laterally and therefore equalize the braking effort. In Figure 3 the intermediate lever 30 is shown as before including the arm 37, while the brake lever 41 is provided with a cooperating arm 38 and the lugs 39 and 40 are shown in contact.

As previously stated, it is desirable to so arrange the linkage that the front brakes will impart a greater percentage of braking than the rear brakes. This is especially true when a power brake is used since a portion of the rear braking is applied to the propeller shaft by the power brake unit. But, in addition to this fact, braking at the forward end of the vehicle is more efficient since more weight is thrown on the front wheels during the retardation of the vehicle. Previously systems have been proposed in which more work is done in braking at the forward end than at the rear, but such systems generally obtain the increased effort by leverage. This results in a greater wear of the front brakes, and, therefore, will result in a lessening of the increased braking at the forward end.

Equalizing levers which have been used to obtain a greater braking force at the forward brakes than at the rear, rapidly float out of adjustment due to the uneven wear between the forward and rear brakes. In our system the increased effort is obtained by travel and not by leverage.

In Figures 4, 5 and 6 diagrammatic views are shown illustrating different modifications of arranging the brake linkage. Thus in Figure 4 we show a forward brake drum 52, and a rear brake drum 53. Within the forward brake drum are mounted the internally expanding brake shoes 54—54 which are normally held in "off" position by the pull-back springs 56—56. The rear brake drum is also provided with internally expanding brake shoes 57—57 normally held in "off" position by the pullback springs 58—58. 59 is the cam lug which, upon movement, will expand the front brake shoes while 60 is a similar cam lug at the rear end for expanding the rear brake shoes 57. The front brake rod 61 is connected at pivot 62 to a lever arm 64 which, upon movement, will tend to turn the lug 59. Similarly rear brake rod 64 is connected at pivot 65 to a lever 66 which operates the lug 60. 67 is a stub shaft upon which is mounted a T-shaped brake lever 68 having a downwardly extending arm 69 and an upwardly extending arm 70. Integral with the lower arm 69 is a laterally extending arm 71 which is in thrust engagement with the arm 72 of the intermediate lever 73 which is also pivoted upon the shaft 67 and includes an upwardly extending arm 74 actuated by the thrusting movement of the power arm 75. Front brake rod 61 is adjustably connected to the lower arm 69 of the T-lever at the pivot 76, while the rear brake rod is similarly connected to the upwardly extending arm 70 at the pivot 77. An emergency pull rod is directly connected to the lever arm 70 at the pivot 77. In this modification the pivot 76 is farther from the pivot shaft 67 than the pivot 77, while the effective leverage between the pivots 62 at the front brake to the axis of the lug 59 is the same as the effective leverage at the rear and between the pivot 65 and the axis of the lug 60. Thus the front brake rod 61 will be given a longer travel than the rear brake rod 64, and, therefore, apply a higher braking force to the front brake drum than that applied to the rear brake drum.

In the modification shown in Figure 5 the mounting and connections of the T-lever are essentially the same as shown in Figure 3 in that the T-lever 68 is provided with an elliptical bearing opening 78, while the distance between the pivotal connection 76 of the front brake rods 61 to the pivot shaft 67 is the same as the distance from the pivotal connection 77 of the rear brake rod 64 to the pivot shaft 67. However, the effective lever arm to the front brakes comprising the distance between the pivotal connection 62 to the axis of the lug 59 is longer than the distance at the rear end between the pivotal connection 65 and the axis of the lug 60. Thus the counter-clockwise movement of the T-lever 68 will impart an equal pull to the rear brake rod 64 and the front brake rod 61 but after the rear brakes have been fully applied, the slots 78 will permit the T-lever to have a further movement due to the longer travel permitted of the pivot 62 and there will be a greater application of pressure to the front brakes.

In this system the linkage is substantially floating and therefore the pressure is evenly distributed to each of the brake rods, but the increased braking force to the front brakes is obtained by the longer leverage at the front end.

The floating permitted by the elliptical bearing opening 78 provides a neutralized center and eliminates any tendency to put a horizontal strain on the pivot 67. It should also be noted that in this arrangement it is desirable to have the contact beween the lateral arms 71 and 72 above the plane which passes through the axis of the pivot normally to the longitudinal plane of the lever arms 69 and 70. In Figure 4 and Figure 6 the contact is below. The contact above the center of the pivot tends to hold the slotted lever normally in such a position that there will always be freedom of movement of the lever while the front brakes are being fully applied. The initial thrust by the power arm 75 will first fully apply the rear brakes and partially apply the front brakes, then further pressure will be equalized in the brake rods by the movement of the T-lever while the front brakes are applied with an increased effective pressure due to the greater effective lever arm at the front end.

In Figure 6 a further modification is shown in which the levers pivoted to the stub shaft 67 are essentially the same as shown in Figure 4 except the brake rods 61 and 64 are connected at equal distances from the center of the pivot. However, in this construction the effective lever arm between the rear brake arm and the axis of turn of the cam lug 60 is longer than the distance between the front pivot 62 and the axis of turn of the front cam lug 59. Therefore, the pressure distributed to the forward and rear brake rods will be substantially the same but the front cam lug will have a larger angular turn than the rear brake lug and therefore it will be possible to impart a greater application of pressure to the front brakes than to the rear brakes.

In the system of linkage in which a greater amount of braking is done at the front end, it will be apparent that the brake lining of the rear brakes will be conserved and since the emergency pull rod 78 is directly connected to pull straight through on the rear brake rod, the rear brakes can still be applied even after the lining of the front brakes is substantially worn out. Further according to the present invention the emergency control has a high effective leverage on the rear brakes due to the long lever arm at the rear.

The constructions which have been described are designed to be readily installed on present types of vehicles and will efficiently serve to control the operation of the brakes. Maximum safety is provided without an unnecessary number of operating parts thereby permitting economical manufacture. By the equalization of the braking effort provided by the improved design of brake lever, it is possible to compensate for slight inaccuracies in the setting of the brakes.

Many modifications and changes may be made in the particular embodiments of the improvements without departing from the spirit of the invention as expressed in the appended claims.

We claim:

1. Brake mechanism for vehicles of the type having forward and rearward brakes, a brake rod extending to the front brakes, a brake rod extending to the rear brakes, a pivoted cross lever having oppositely extending arms, one of said arms being connected to the front brake rod and the other of said arms being connected to the rear brake rod, means for selectively operating said lever from one source, said means including a power actuated arm and independent means to selectively operate said lever from another source, said means comprising a rod connected to one of said arms and a lever arranged to transmit movement to said rod.

2. Brake mechanism of the type having forward and rearward brakes, a brake rod extending to the front brakes, a brake rod extending to the rear brakes, a pivoted T-shaped cross lever having substantially upwardly and downwardly extending arms and a laterally extending arm, said front brake rod being connected to the lower of said arms and said rear brake rod being connected to the upper of said arms, means to selectively control the operation of said lever comprising a pivoted lever in thrust engagement with said laterally extending arm of said T-shaped lever and independent means to selectively operate said T-shaped lever from another source, said means including a rod connected to the upwardly extending arm of said T-shaped lever.

3. Brake mechanism comprising a power operated arm, a pivoted brake lever, brake rods connected to the oppositely extended arms of said brake lever, an intermediate lever axially pivoted with respect to the brake lever, said intermediate lever having an arm adapted to be engaged by said power arm, said levers including cooperating lugs causing movement of said levers as a unit upon the actuation of said power arm, said brake lever being free to be moved in an operative direction independent of said intermediate lever.

4. Brake mechanism comprising a power operated arm, a pivoted brake lever, brake rods connected to the oppositely extended arms of said brake lever, an intermediate lever axially pivoted with respect to the brake lever, said intermediate lever having an arm adapted to be engaged by said power arm, said levers including cooperating lugs causing movement of said levers as a unit upon the actuation of said power arm, said brake lever being free to be moved in an operative direction independent of said intermediate lever, and means selectively operable to actuate said brake lever independent of the operation of said power arm.

5. Brake mechanism comprising a power operated arm, an intermediate L-shaped lever pivotally mounted on a fixed supporting shaft, a substantially T-shaped brake operating lever pivotally mounted upon said supporting shaft, one of the arms of said L-shaped lever being designed to engage said power operated arm, the other of the arms of said L-shaped lever being designed to engage one of the arms of said T-shaped lever, brake operating rods connected to the remaining arms of said T-shaped lever whereby the actuation of said power operated arm will effect a movement of said brake lever and transmit the braking force to said brake rods.

6. Brake mechanism comprising a power operated arm, an intermediate L-shaped lever pivotally mounted on a fixed supporting shaft, a substantially T-shaped brake operating lever pivotally mounted upon said supporting shaft, one of the arms of said L-shaped lever being designed to engage said power operated arm, the other of the arm of said L-shaped lever being designed to engage one of the arms of said T-shaped lever, brake operating rods connected to the remaining arms of said T-shaped lever whereby the actuation of said power operated arm will effect a movement of said brake lever and transmit the braking force to said brake rods, and independent control means connected to one of the arms of said T-shaped lever.

7. Brake mechanism comprising a substantially T-shaped operating lever, a supporting shaft on which said lever is pivoted, brake rods connected to two of the arms of said lever which extend substantially in alignment, means for imparting a thrust to the third arm of said lever at a point laterally spaced from its pivot in order to turn said lever and means permitting said lever to move laterally with respect to its supporting shaft in order to equalize the pull upon the brake rods.

8. Brake mechanism comprising a pivoted operating lever, said lever having oppositely extending arms, one of said arms being connected to a forward brake rod and the other of said rams being connected to a rear brake rod, a third arm integrally formed with respect to said oppositely extending arms, a substantially L-shaped intermediate lever, a supporting shaft upon which both of said levers are pivoted, one of said arms of said L-shaped lever being in thrust engagement with said laterally extending arm of said operating lever, means for imparting a thrust to the other of said arms of said L-shaped lever in order to actuate said operating lever and means permitting said operating lever to laterally move with respect to its supporting shaft in order to provide a balanced center.

9. Brake mechanism comprising forward and rear sets of brakes, a power brake unit, a fixed fulcrum, a lever pivoted on said fixed fulcrum and operated by said power unit, a second lever mounted to float on said fulcrum, said levers including slidable arms in thrust engagement at a point below said fulcrum and brake rods connected to said second lever at points above and below said fulcrum.

10. Brake mechanism comprising forward and rear sets of brakes, a power brake unit, a fixed fulcrum, a lever pivoted on said fixed fulcrum and operated by said power unit, a second lever mounted to float on said fulcrum, said levers including slidable arms in thrust engagement at a point below said fulcrum, brake rods connected to said second lever at points below and above said fulcrum, said brake rods being connected to apply said front and rear brakes.

11. Brake mechanism comprising a vertically disposed brake applying lever, said lever comprising oppositely extending upper and lower arms, an arm having a contact face on its upper side, a floating pivot point for said lever, said contact face being above said floating pivot, means to apply a thrust to said contact face to turn said lever, brake rods connected to the upper and lower arms of said lever and forward and rear brakes connected to be operated by the movement of said brake rods.

12. Brake mechanism comprising a brake applying lever, said lever comprising oppositely extending upper and lower arms and a contact face integrally formed with said lever, said contact face having its plane normal to the length of said lever arms, a fixed pivot point for said lever, means to apply a thrust to said contact face to turn said lever, brake rods connected to the upper and lower arms of said lever and forward and rear brakes connected to be operated by the movement of said brake rods.

13. Brake mechanism comprising a substantially vertically disposed brake applying lever, said lever being pivoted at a fixed point and including upper and lower arms extending from said fixed point, brake rods connected to the upper and lower arms of said lever, forward and rear brakes connected to be operated by the movement of said brake rods, and means for applying a substantially vertical thrust to said lever to turn said lever about said fixed pivot.

14. Brake mechanism comprising a substantially vertically disposed brake applying lever, said lever being pivoted at a fixed point and including upper and lower arms extending from said fixed point, brake rods connected to the upper and lower arms of said lever, forward and rear brakes connected to be operated by the movement of said brake rods, means for applying a substantially vertical thrust to said lever to turn said lever about said fixed pivot, the point of connection of the front brake rod to the lower arm of said lever being farther from the center of said fixed pivot than the point of connection of the rear brake rod to the upper arm of said lever and said vertical thrust being transmitted to said lever at a point below the center of said fixed pivot whereby a horizontal thrust on the fixed pivot point is prevented.

15. Brake mechanism for vehicles of the type having front and rear brakes, a double arm pivoted brake lever, a pull rod connected to one arm of said lever and extending to actuate the rear brakes, a pull rod connected to the other arm of said lever below the pivot and extending to actuate the front brakes, a pivoted hand lever, a linkage connection between said hand lever and said brake lever, said linkage connection extending in line with the pull rod extending towards the rear brakes, a rockable member directly engaging said brake lever intermediate said pull rod connections and pedal-controlled means for actuating said rockable member to operate said brake lever and apply the front and rear brakes independent of operation of said hand lever.

16. Brake mechanism for vehicles of the type having front and rear brakes, a double arm pivoted brake lever, a pull rod connected to one arm of said lever and extending to actuate said rear brakes, a pull rod connected to the other arm of said brake lever below the pivot and extending to actuate the front brakes, a pivoted emergency lever, linkage extending between said emergency lever and said brake lever in line with said rearwardly extending pull rod, said linkage being pivotally connected to said brake lever and connected to said emergency lever with provision for lost motion, a rockable member directly engaging said brake lever intermediate said pull rod connections for actuating said brake lever independent of said emergency lever and power brake mechanism under the control of the operator for actuating the rockable member.

17. Brake mechanism comprising front and rear sets of brakes, a power brake unit, a fixed fulcrum, a lever pivoted on said fixed fulcrum operative by said power brake unit, a double arm brake lever pivotally mounted on said fixed fulcrum, oppositely extending brake pull rods connected to said brake lever at points above and below said fulcrum, said levers including cooperating portions in thrust engagement for transmitting movement of said first lever to said brake lever.

18. Brake mechanism of the type having front and rear brakes, a pivoted substantially T-shaped brake lever having upwardly and downwardly extending arms and a laterally extending arm, a front brake rod connected to the lower of said arms, a rear brake rod connected to the upper of said arms and means to control the operation of said lever comprising a pivoted lever in thrust engagement with said laterally extending arm.

19. A braking system for motor vehicles comprising front and rear sets of brakes, a pivoted brake lever carried at an intermediate point on said vehicle, forwardly and rearwardly extending brake pull rods connected to the oppositely extending arms of said lever at equal distances from the pivot thereof, said front and rear sets of brakes including brake actuating cams operated by said pull rods, levers at the front and rear of the vehicle connecting the pull rods to the cams, the effective leverage at the front of the vehicle between the pull rods and the cams being less than at the rear of the vehicle, the brake linkage constituting a rigid system whereby all the brake actuating cams turn together, the front brake cams having a greater effective movement than the rear brake cams, means for transmitting operative movement to the brake lever having the oppositely extending arms intermediate the pull rod connections thereto and an independent operating connection to said brake lever substantially in line with the rearwardly extending pull rod and capable of producing a greater effective braking pressure upon the rear brakes should the front brakes fail than during normal operation.

Signed at Chicago, Illinois, this 24th day of May, 1929.

EDWARD A. ROCKWELL.
EDWIN R. EVANS.